Jan. 22, 1952           F. A. FUA           2,582,981
METHOD AND APPARATUS FOR THE EMPLOYMENT OF RADIATION
FROM RADIOACTIVE MATERIAL IN GAUGING
Filed June 16, 1949
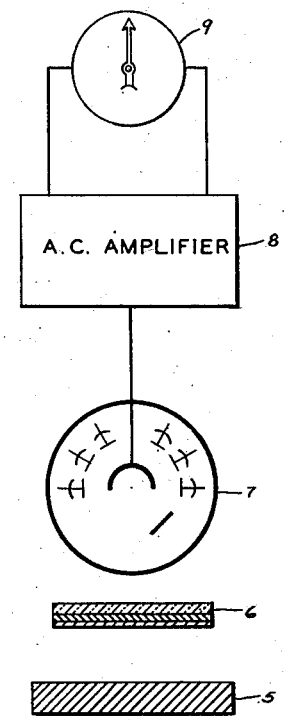
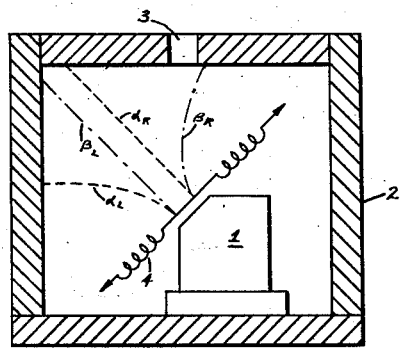
INVENTOR.
FREDERIC ALBERT FUA
BY
Pennie, Edmonds, Morton & Barrows
HIS ATTORNEYS Patented Jan. 22, 1952

2,582,981

UNITED STATES PATENT OFFICE 2,582,981

METHOD AND APPARATUS FOR THE EMPLOYMENT OF RADIATION FROM RADIOACTIVE MATERIAL IN GAUGING

Frederic Albert Fua, New York, N. Y.

Application June 16, 1949, Serial No. 99,406

7 Claims. (Cl. 250—83.6)

This invention relates to a method and apparatus for the employment of radiations from radioactive material, especially $\beta$ rays, in material gaging and inspecting. The invention is distinguished by the introduction, through electrostatic or magnetic means, of a carrier pulsation into the measuring ray, whereby the intensity of the beam at its point of detection can be translated into a quantitatively sensible signal through a system of A. C. amplification. A further distinguishing characteristic of the invention is that the same electrostatic or magnetic means may be used to effect a selection of the desired ray component from among the total radiation present.

Applicant is already aware of proposals that have been made for the use of X-ray in gaging, for example in the application of Fua and Woods, Serial No. 558,928, filed October 16, 1944, now Patent #2,525,292, and in the refinement of that proposal by introducing a regularly recurring component into the X-ray to permit the use of A. C. amplification circuits, as shown for example in the Fua application, Serial No. 561,361, filed November 1, 1944, now Patent #2,530,517. Applicant is also conversant with U. S. Patent No. 2,264,725, to Shoupp et al., issued December 2, 1941. The present invention is in fact the result of applicant's efforts to develop a method and apparatus achieving the outstanding results with respect to precision and accuracy achieved with the X-ray apparatus referred to in the low range of densities of material under examination which the employment of $\beta$ rays affords.

Stated in its simplest terms, the invention comprises a source of radioactive radiation arranged to emit its energy in a preselected path enclosed in a confining chamber having a predetermined exit aperture located outside the normal path of the radiations, but so disposed that the desired component of the total radiations can be electrostatically or magnetically deflected to pass out of the aperture at will.

A suitable apparatus for putting into practice the principle of this invention is illustrated diagrammatically in the accompanying drawing.

Referring to that drawing, we have a source of radioactive radiation 1 from which the radiated beam follows a normal path, when unaffected by external forces, which may be roughly demarked by the dotted line $a_R$ on the right and the dash-dotted line $\beta_L$ on the left. This source is enclosed in a radiation arresting chamber 2 which is pierced by an aperture 3.

It will be observed that the aperture 3 does not lie in the normal path of the radiations from the source 1 and thus substantially no radiations normally escape from chamber 2. There is associated, however, with the source 1 conventional deflecting coils 4. The interrelationship between the location of aperture 3, the normal path of radiation from source 1 and the characteristics of coils 4 is so arranged that, under the influence of a pulsating current applied to coils 4, the $\beta$ ray component of the total radiations is caused to be deflected backward and forward across the space defined by the dash-dotted lines $\beta_R$ and $\beta_L$.

As is well known, $\gamma$ rays present in the total radiation from the source 1 will not be deflected and will, therefore, continue to follow the normal radiation path regardless of the effect of coils 4. The $\alpha$ rays, on the other hand, are deflected, but, being of opposite polarity from the $\beta$ rays, they are deflected in the opposite direction. We may, therefore, consider that the path of the $\alpha$ rays under the influence of coil 4 will remain in the area defined by the dotted lines $a_R$ and $a_L$. It is plain, upon examination of the drawing, therefore, that the result of the intermittent deflection produced in radiations from the source 1 by coils 4 will be to cause the regularly intermittent projection of a $\beta$ ray component through aperture 3, the other components of the radiation remaining within chamber 2.

The specimen 5 of material to be examined is arranged in the path of the $\beta$ rays intermittently projected from aperture 3. A fluorescent screen assembly 6 is arranged beyond specimen 5 to receive and to be excited by the $\beta$ rays penetrating it. A photocell 7, preferably of the multiplier type, is associated with fluorescent screen 6 in such a way that the light from screen 6 falling on photocell 7 is proportional to the strength of the $\beta$ rays reaching screen 6 through specimen 5.

The output of photocell 7 is fed to amplifier 8 which, because of the intermittent character imposed upon the $\beta$ rays reaching screen 6, may be of alternating current type. The importance of this, as compared with amplifiers of the D. C. type, cannot be exaggerated in the construction of accurate and precise measuring instruments. The output of the amplifier 8 is in turn fed to indicating apparatus, for example, a galvanometer 9, which may be calibrated to read in a variety of ways, depending upon the nature of the material 5 being examined. Particularly suitable for $\beta$ ray examination are thin films and filaments, for example moving fine gage aluminum foil or moving single filaments of artificial fiber, such as rayon or nylon. In examining such materials, the galvanometer 9 could be calibrated directly in the customary units of thickness measurement commercially employed in describing the product examined.

Applicant has selected for illustration in this application the simplest arrangement of radiation detection, amplification, and indication means because it is only with the method and apparatus of this invention that such simple means can be employed in apparatus commercially useful in accuracy and precision. By this is meant that, because of two of the characteristics of the invention, it is possible to do away with the comparison sample required both in the X-ray apparatus illustrated in Application Serial No. 558,928, and in Patent No. 2,264,725. This is because, with apparatus employing the method of this invention, it is possible to employ in the source 1 a primary radioactive material having a half life so long that for any day-to-day or month-to-month purposes the strength of its radiations can be regarded as absolutely constant. These two characteristics are, first, the introduction of pulsation into the β rays permitting the use of A. C. amplification with consequent avoidance of drift and, second, the separation by deflection of the β ray from the undesirable α and γ rays.

That is not, however, to be taken to preclude the use of comparison systems with this invention since, for example, the advantage of the introduction of pulsation into the β ray component by means of the apparatus of this invention would be substantial, even if it were employed with a short half-life source of primary radioactive radiation such as shown in Patent No. 2,264,725. And a system of "bucking" in order to cancel out the "steady" component of the signal, i. e. the minimum voltage developed by the photocell assembly receiving radiation passing through the unknown at maximum gageable thickness, would increase the sensitivity since the entire net signal then reaching the indicating apparatus would reflect departure from that maximum.

Moreover, it is obvious that electrostatic deflection plates may be substituted for coils 4, if desired. Additionally, the field strength required for the desired beam separation can be advantageously obtained by powering the coils 4 with intermittent, unidirectional current pulses of the required intensity. The apparatus suitable for continuous operation with such a power feed is substantially less cumbersome than that required when an A. C. power supply is used. And finally, a rotating high-strength permanent magnet appropriately located can be employed in lieu of coils 4.

I accordingly do not wish to be limited to the details of the embodiment disclosed, but rather by the scope of the appended claims.

I claim:

1. The method of inspecting material by radioactive radiation which comprises directing a beam of composite radioactive radiation components including at least one component of charged particles in predetermined direction, deflecting a desired charged particle component of that beam intermittently to pass through the material under examination, and measuring the strength of the deflected component so passing through.

2. The method of inspecting material by β ray which comprises directing a beam of composite radioactive radiation components including β ray in a predetermined direction, selectively deflecting the β ray intermittently to pass through the material under examination, and measuring the strength of the β ray so passing through.

3. In apparatus for the inspection of material by radioactive radiation, the combination including a source of a beam of composite radioactive radiation including a component of charged particles, a radiation impervious chamber enclosing said source having an aperture therethrough outside the normal path of said beam, deflection means associated with said beam capable of intermittently deflecting a charged particle component of said beam to pass through said aperture, means for holding a specimen of material to be examined in the path of the deflected radiation component emerging from said aperture, and means for measuring the strength of said deflected component arranged in the path thereof beyond said holding means.

4. Apparatus according to claim 3 in which the source of the beam of radioactive radiation includes a primary radioactive material having a long half-life.

5. Apparatus according to claim 3 in which the deflection means include electromagnetic coils fed by a pulsating current.

6. Apparatus according to claim 3 in which the measuring means include means for converting the impinging intermittent deflected component into an intermittent electric signal of proportional strength, A. C. amplification means receiving said signal, and indicating means for indicating the strength of the output of said amplification means.

7. Apparatus according to claim 6 in which the means for converting include a fluorescent screen excited by the deflected component and a photocell for measuring the excitation of said screen.

FREDERIC ALBERT FUA.

REFERENCES CITED

The following references are of record in the file of this patent:

UNITED STATES PATENTS

| Number | Name | Date |
|---|---|---|
| 1,242,377 | Schmidt | Oct. 9, 1917 |
| 2,275,748 | Fearon | Mar. 10, 1942 |
| 2,488,269 | Clapp | Nov. 15, 1949 |

FOREIGN PATENTS

| Number | Country | Date |
|---|---|---|
| 482,354 | Great Britain | June 19, 1936 |